US012158937B2

(12) United States Patent
Abdou et al.

(10) Patent No.: US 12,158,937 B2
(45) Date of Patent: Dec. 3, 2024

(54) SYSTEMS AND METHODS FOR UNIQUELY IDENTIFYING AND REGULARLY AUTHENTICATING USERS AT LOGIN

(71) Applicant: JPMORGAN CHASE BANK, N.A., New York, NY (US)

(72) Inventors: Meena Abdou, New York, NY (US); Hima Unnithan, New York, NY (US); Sunil Atluri, New York, NY (US); Amit Kumar Meshram, New York, NY (US); Thien B Le, League City, TX (US); Atousa Assadihaghi, New York, NY (US); Rhea Marpu, New York, NY (US); Rocky J Maufort, West Chester, PA (US); Moshe Caplan, New York, NY (US); Ben Craig, New York, NY (US); Myna Rai, New York, NY (US); Srinwantu Dey, New York, NY (US); Paul Manaloto, Woodridge, IL (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 270 days.

(21) Appl. No.: 17/806,342

(22) Filed: Jun. 10, 2022

(65) Prior Publication Data
US 2023/0401304 A1 Dec. 14, 2023

(51) Int. Cl.
*G06F 21/31* (2013.01)
*G06F 21/32* (2013.01)
(Continued)

(52) U.S. Cl.
CPC .............. *G06F 21/34* (2013.01); *G06F 21/32* (2013.01); *G06F 21/41* (2013.01)

(58) Field of Classification Search
CPC .......... G06F 21/34; G06F 21/32; G06F 21/41; G06F 21/316
See application file for complete search history.

(56) References Cited

U.S. PATENT DOCUMENTS

2008/0289030 A1* 11/2008 Poplett .................... G06F 21/31
726/14
2013/0227651 A1* 8/2013 Schultz .................. G06F 21/32
726/4
(Continued)

*Primary Examiner* — Vu V Tran
(74) *Attorney, Agent, or Firm* — GREENBERG TRAURIG LLP (57) ABSTRACT

Systems and methods for uniquely identifying and regularly authenticating users at login are disclosed. A method may include an authentication computer program receiving a user identifier for a user as part of a login attempt from a workstation computer program; communicating a multifactor authentication request to an authenticator application executed on a user mobile electronic device; receiving a response to the multifactor authentication request from the authenticator application; verifying that the response to the multifactor authentication request matches an expected value; and saving user activity data associated with the login attempt, and a user trust computer program calculating a user trust score based on the user activity data; determining that the user trust score is above a threshold; and authorizing the login attempt to the workstation and a user session on the workstation.

18 Claims, 4 Drawing Sheets

(51) Int. Cl.
*G06F 21/34* (2013.01)
*G06F 21/41* (2013.01)

(56) References Cited

U.S. PATENT DOCUMENTS

| | | | |
|---|---|---|---|
| 2015/0106900 A1* | 4/2015 | Pinski | H04W 12/068 |
| | | | 726/7 |
| 2022/0164424 A1* | 5/2022 | Keith, Jr. | H04L 9/0866 |
| 2023/0029053 A1* | 1/2023 | Manuel-Devadoss | ............... |
| | | | H04L 9/3231 |

* cited by examiner

SYSTEMS AND METHODS FOR UNIQUELY IDENTIFYING AND REGULARLY AUTHENTICATING USERS AT LOGIN

BACKGROUND OF THE INVENTION

1. Field of the Invention

Embodiments relate generally to systems and methods for uniquely identifying and regularly authenticating users at login.

2. Description of the Related Art

In order to access a user account, a user typically enters a username and password. This technique, however, has drawbacks as a password may be compromised or guessed by a hacker. Thus, even if a username and password are entered correctly, there is a possibility that it is a malicious actor—not the user—who has logged on.

SUMMARY OF THE INVENTION

Systems and methods for uniquely identifying and regularly authenticating users at login are disclosed. According to one embodiment, a method for uniquely identifying and regularly authenticating users at login may include: (1) receiving, by an authentication computer program executed by a backend electronic device and from a workstation computer program executed by a workstation, a user identifier for a user as part of a login attempt; (2) communicating, by the authentication computer program, a multifactor authentication request to an authenticator application executed on a user mobile electronic device; (3) receiving, by the authentication computer program, a response to the multifactor authentication request from the authenticator application; (4) verifying, by the authentication computer program, that the response to the multifactor authentication request matches an expected value; (5) saving, by the authentication computer program, user activity data associated with the login attempt; (6) calculating, by a user trust computer program executed by the backend electronic device, a user trust score based on the user activity data; (7) determining, by the user trust computer program, that the user trust score is above a threshold; and (8) authorizing, by the user trust computer program, the login attempt to the workstation and a user session on the workstation.

In one embodiment, the multifactor authentication request may include a request to receive a machine-readable code from the workstation, a response to a push notification to the user mobile electronic device, a proximity indication between the user mobile electronic device and the workstation, a biometric or password provided by the user, etc.

In one embodiment, the user activity data may include attributes include a time of day, a location of the workstation, an internet service provider for the user mobile electronic device, a geolocation of the user mobile electronic device, user mobile electronic device operating system information, or user mobile electronic device.

In one embodiment, the threshold may be based on a prior user activity data.

In one embodiment, the user trust computer program may train a machine learning engine using the prior user activity data.

In one embodiment, the user session may be limited based on the user trust score.

In one embodiment, the method may also include monitoring, by the user trust computer program, user activity during the user session; updating, by the user trust computer program, the user trust score; and requiring, by the user trust computer program, additional authentication in response to the updated user trust score falling below the threshold.

In one embodiment, the threshold for the user trust score may be dynamic and varies based on a time of day, a day of the week, a user location, and/or one or more networks over which the user mobile electronic device communicates.

According to another embodiment, a method for uniquely identifying and regularly authenticating users at login may include: (1) receiving, by an authentication computer program executed by a backend electronic device and from a workstation computer program executed by a workstation, a user identifier for a user as part of a login attempt; (2) communicating, by the authentication computer program, a multifactor authentication request to an authenticator application executed on a user mobile electronic device; (3) receiving, by the authentication computer program, a response to the multifactor authentication request from the authenticator application; (4) verifying, by the authentication computer program, that the response to the multifactor authentication request matches an expected value; (5) saving, by the authentication computer program, user activity data associated with the login attempt; (6) calculating, by a user trust computer program executed by the backend electronic device, a user trust score based on the user activity data; (7) determining, by the user trust computer program, that the user trust score is below a threshold; (8) receiving, by the user trust computer program, an additional authentication factor from the user; (9) validating, by the user trust computer program, the additional authentication factor; and (10) authorizing, by the user trust computer program, the login attempt to the workstation and a user session on the workstation.

In one embodiment, the multifactor authentication request comprises a request to receive a machine-readable code from the workstation, a response to a push notification to the user mobile electronic device, or a proximity indication between the user mobile electronic device and the workstation.

In one embodiment, the multifactor authentication request may include a biometric or password provided by the user.

In one embodiment, the user activity data may include attributes include a time of day, a location of the workstation, an internet service provider for the user mobile electronic device, a geolocation of the user mobile electronic device, user mobile electronic device operating system information, or user mobile electronic device.

In one embodiment, the threshold may be based on a prior user activity data.

In one embodiment, the user trust computer program may train a machine learning engine using the prior user activity data.

In one embodiment, the user session may be limited based on the user trust score.

In one embodiment, the method may further include monitoring, by the user trust computer program, user activity during the user session; updating, by the user trust computer program, the user trust score; and requiring, by the user trust computer program, additional authentication in response to the updated user trust score falling below the threshold.

In one embodiment, the threshold for the user trust score may be dynamic and varies based on a time of day, a day of the week, a user location, and/or one or more networks over which the user mobile electronic device communicates.

According to another embodiment, a system may include: a user workstation executing a workstation computer program; a user mobile electronic device executing an authenticator application; and a backend electronic device executing an authentication computer program and a user trust computer program. The workstation computer program may receive a user identifier for a user as part of a login attempt and provides the user identifier to the authentication computer program. The authentication computer program may communicate a multifactor authentication request to the authenticator application, the multifactor authentication request comprising a request to receive a machine-readable code from the workstation, a response to a push notification to the user mobile electronic device, a proximity indication between the user mobile electronic device and the workstation, a user biometric, or a user password, and may receive a response to the multifactor authentication request from the authenticator application, may verify that the response to the multifactor authentication request matches an expected value, and may save user activity data associated with the login attempt. The user trust computer program may calculate user trust score based on the user activity data, may determine that the user trust score is above a threshold, and may authorize the login attempt to the workstation and a user session on the workstation.

In one embodiment, the user trust computer program may monitor user activity during the user session, updates the user trust score, and may require additional authentication in response to the updated user trust score falling below the threshold.

BRIEF DESCRIPTION OF THE DRAWINGS

In order to facilitate a fuller understanding of the present invention, reference is now made to the attached drawings. The drawings should not be construed as limiting the present invention but are intended only to illustrate different aspects and embodiments.

DETAILED DESCRIPTION OF PREFERRED EMBODIMENTS

Embodiments relate generally to systems and methods for uniquely identifying and regularly authenticating users at login.

Embodiments may leverage information that may be collected by various systems to train a machine learning-based algorithm to generate a trust score that may be used with the user device for multi factor authentication. The trust score may be based on, for example, the geolocations of the workstation and the user mobile electronic device, a time of day, network(s) used, prior failed logins, prior session durations, etc. In one embodiment, the received data (e.g., geolocations, times of day, IP addresses, Internet Service Providers, computer networks, etc.) may be compared to historical data and any anomalies may be detected. The trust score may be periodically recalculated, and if the trust score falls below a threshold, the user may be required to re-authenticate.

In one embodiment, certain user trust scores may give access to a first level of features (e.g., email). If the user trust score is not above a threshold for a second level of features (e.g., applications), the user may be required to provide additional authentication before access to the second level of features is granted.

In one embodiment, a threshold for the user trust score may be dynamic and may vary depending on the time of day, day of the week, time of year, etc. It may also vary depending on the user location, the networks over which the user communicates, the user's status (e.g., new user versus veteran user), etc.

Figure 1:
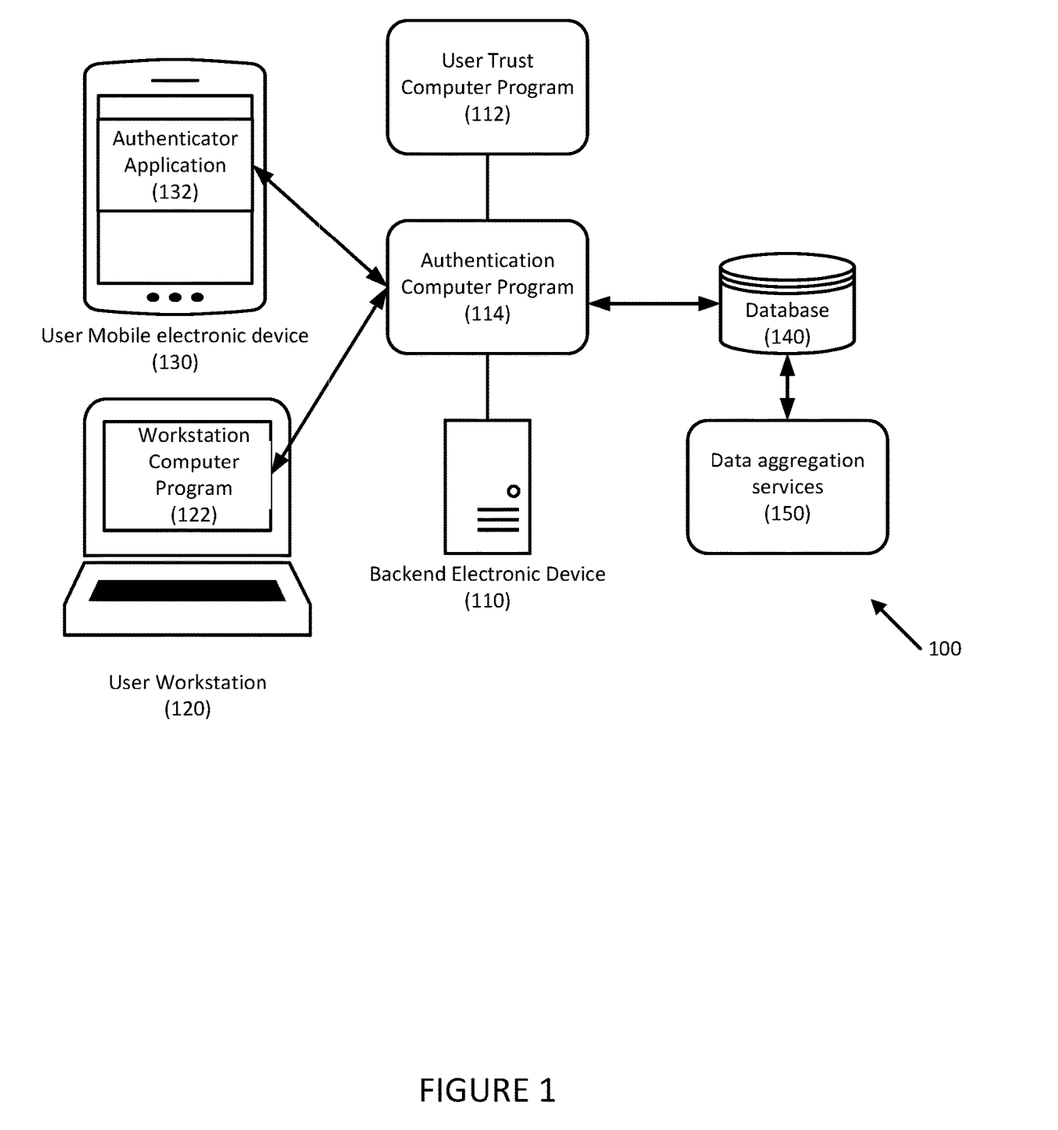
FIG. 1 depicts a system for uniquely identifying and regularly authenticating users at login according to an embodiment.

Referring to FIG. 1, a system for uniquely identifying and regularly authenticating users at login is disclosed according to an embodiment. System 100 may include backend electronic device 110 which may be any suitable electronic device, including servers (cloud and/or physical), computers (e.g., workstations, desktops, laptops, notebooks, tablets, etc.), etc. Backend electronic device 110 may execute authentication computer program 112 and user trust computer program 114.

Although two computer programs (authentication computer program 112 and user trust computer program 114) are illustrated, it should be noted that a single computer program may perform the tasks describe as being performed by authentication computer program 112 and user trust computer program 114. Alternatively, additional computer programs (not shown) may be provided to perform the tasks described as being performed by authentication computer program 112 and user trust computer program 114.

System 100 may include user workstation 120 which may be a computer, such as a desktop, laptop, notebook, or tablet. User workstation 120 may execute workstation computer program 122.

System 100 may include user mobile electronic device 130 which may be any suitable mobile electronic device, including smartphones, mobile computers, Internet of Things (IoT) appliances, etc. User mobile electronic device 130 may execute authenticator application 132.

System 100 may further include database 140 that may store data about the user, such as user locations (e.g., home), networks, IP addresses, Internet Service Provider (ISP) identification, etc. It may further store historical user information, including normal business hours, historical location data, historical network data, user mobile electronic device information, etc.

In one embodiment, historical user information may be received from one or more data aggregation services 150, such as human resources systems, security information and event management systems, infrastructure inventory systems, etc. Other data aggregation services may be used as is necessary and/or desired.

In one embodiment, backend electronic device 110 may expose application programming interfaces (APIs) to allow software application frameworks to interface with authentication computer program 112 and/or user trust computer program 114. This may include user authentication, authorization of user actions on software applications, etc.

Figure 2:
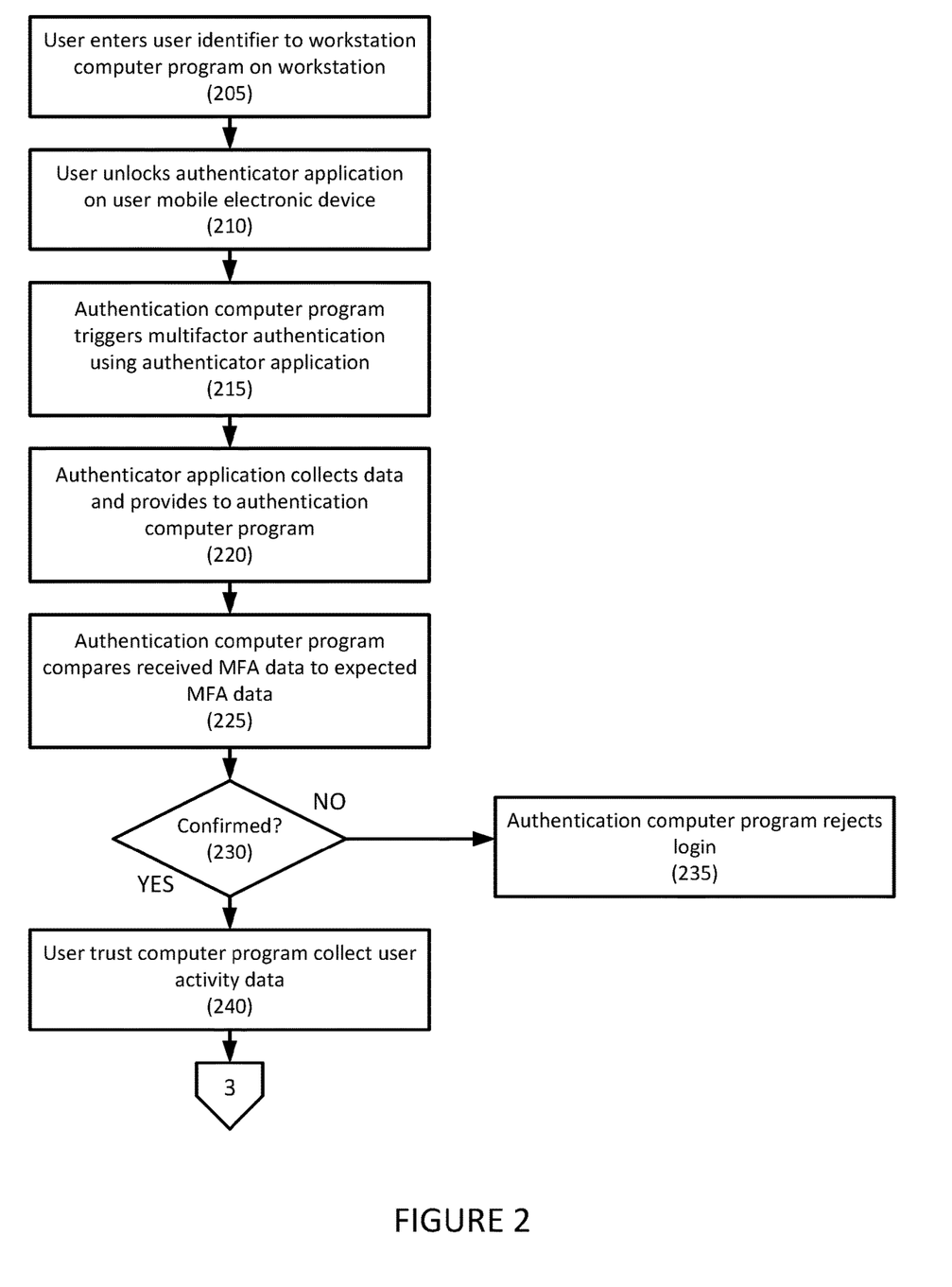
FIGS. 2 and 3 depict a method for uniquely identifying and regularly authenticating users at login according to an embodiment.
Figure 3:
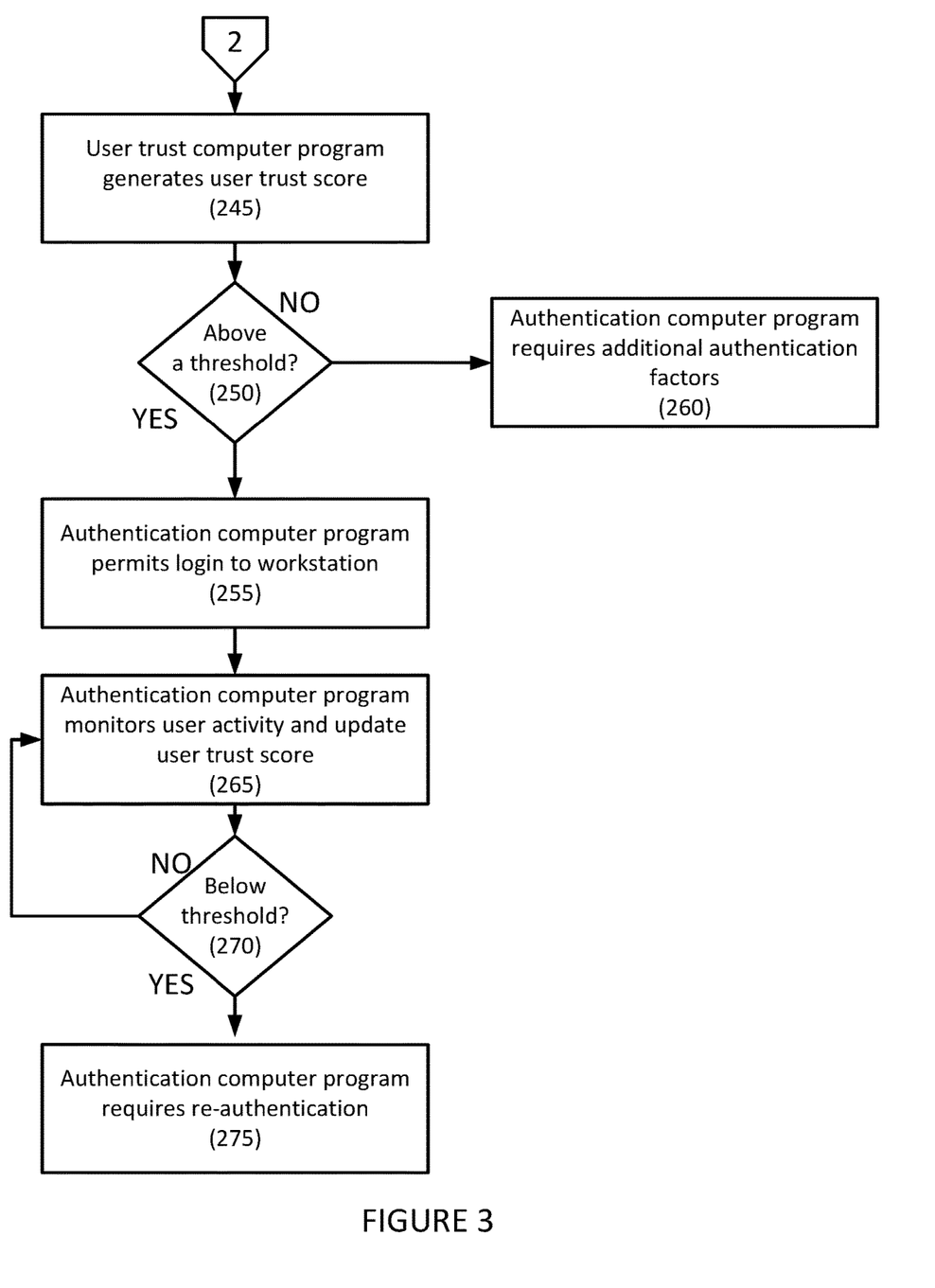

Referring to FIGS. 2 and 3, a method for uniquely identifying and regularly authenticating users at login is disclosed according to an embodiment.

In step 205, a user may enter a user identifier to workstation computer program on workstation. For example, the user may enter a password, an employee number, etc. The workstation computer program may communicate the user identifier to an authentication computer program executed by a backend electronic device.

In step 210, the user may unlock an authenticator application executed by the user mobile electronic device. The user may unlock the authentication application using, for example, a biometric, a password, a passcode, a gesture, etc.

In step 215, the authentication computer program at the backend may trigger multifactor authentication using the authenticator application on the mobile electronic device. For example, using the user identifier, the authentication computer program may request the authenticator application to scan a quick response, or QR code, from the workstation. In another embodiment, the authentication computer program may provide a push notification to the authenticator application. In another embodiment, the authentication computer program may perform a device proximity check (e.g., Near Field Communication, Bluetooth, Ultrawideband, etc.) between the workstation and the mobile electronic device. In another embodiment, the authentication computer program may request that the authenticator application receive additional biometrics (e.g., a different biometric than was used to unlock the authenticator application), a password, etc. In another embodiment, the authentication computer program may request the authenticator application to read the user's badge. Other types of information may be requested as is necessary and/or desired.

In step 220, the authenticator application may receive the information and may provide it to the authentication computer program.

In step 225, the authentication computer program may compare the received multifactor authentication data to an expected value for the multifactor authentication. If, in step 230, the received multifactor authentication data is not confirmed, in step 235, the login may be rejected. In one embodiment, the authentication computer program may collect and save user activity data associated with the login attempt, including attributes such as the time of day, location of the user workstation, networks and/or ISPs involved (e.g., for the workstation or the user mobile electronic device), a geolocation of the user mobile electronic device, a current state, health, and/or threat level of the network (e.g., in the form of a strictness or tolerance level), operating system information, browser information, application information. In one embodiment, internal access certification systems may ensure that inappropriate permissions are not granted to users.

If, in step 230, the received multifactor authentication data is confirmed, in step 240, the authentication computer program may collect user activity data associated with the login attempt, such as the time of day, location of the user workstation, networks and/or ISPs involved, geolocation of the user mobile electronic device, etc.

In step 245, the authentication computer program may provide the user activity data to a user trust computer program that may generate a user trust score for the user based on the user activity data.

In one embodiment, the user activity data may be stored in a table with rows and columns. Any other suitable data structure may be used. Each column may identify an attribute in the user activity data, and each row may be one instance of the attribute. Over, additional data may be added in the form of new attributes, such as new columns. As an illustrative example, a table may start with an initial set of columns (attributes) that have been identified and no rows. At day 0, a user will add one row. By day 90, that user may have 90 rows. And, as additional attributes are identified, additional columns may be added to a table. The trust score may be calculated at day 0 but it will be more accurate by day 90, as more rows means more samples which yields a more accurate machine learning model.

The machine learning model may be trained as additional user activity data is received. For example, as additional data points (i.e., rows) are added, the user trust computer program may retrain the machine learning model based on those data points. Similarly, as additional attributes (i.e., columns) are added, the trust computer program may retrain the machine learning model based on those additional attributes and the data points for those attributes.

In one embodiment, the machine learning model may be trained using a continuous feedback loop during operation, or on a periodic schedule in a distinct environment that is separate from the operational environment.

In step 250, if the user trust score is above a threshold, in step 255 the authentication computer program may authorize the user to login to the user workstation, and a user session on the workstation may be initiated. In one embodiment, the trust score may limit the user session to certain types, levels of features. For example, a certain user trust score may be required to access all features during the user session (e.g., read and send email, applications, etc.), while a lower user trust score may only allow the user to access a limited set of features during the user session (e.g., read email only). The thresholds for the user trust scores may be set as is necessary and/or desired, and may vary during anticipated times of fraud. The anticipated times of fraudulent activity may be based on historical data.

If the score is not above the threshold, in step 260, the authentication computer program may require one or more additional authentication factors from the user before the access to the workstation is granted. For example, the authentication computer program may require out of band authentication, biometrics, a secure token entry, etc. Once the authentication computer program validates the additional biometric, it may allow access to the workstation.

In step 265, once access is granted, the authentication computer program may continue to monitor and collect user activity data during the user session and may update the user trust score. For example, the authentication computer program may monitor attributes such as the user's patterns of usage, patterns of activity, inactivity (e.g., how often the user's screen is locked, how often the user moves or clicks on mouse or other input, etc.

If, in step 270, the updated user trust score is below the threshold, in step 275, the authentication computer program may require the user to re-authenticate. The re-authentication may be a full re-authentication, an out of band message, etc.

If the updated user trust score is above the threshold, the authentication computer program may continue to monitor the user activity and update the user trust score.

Figure 4:
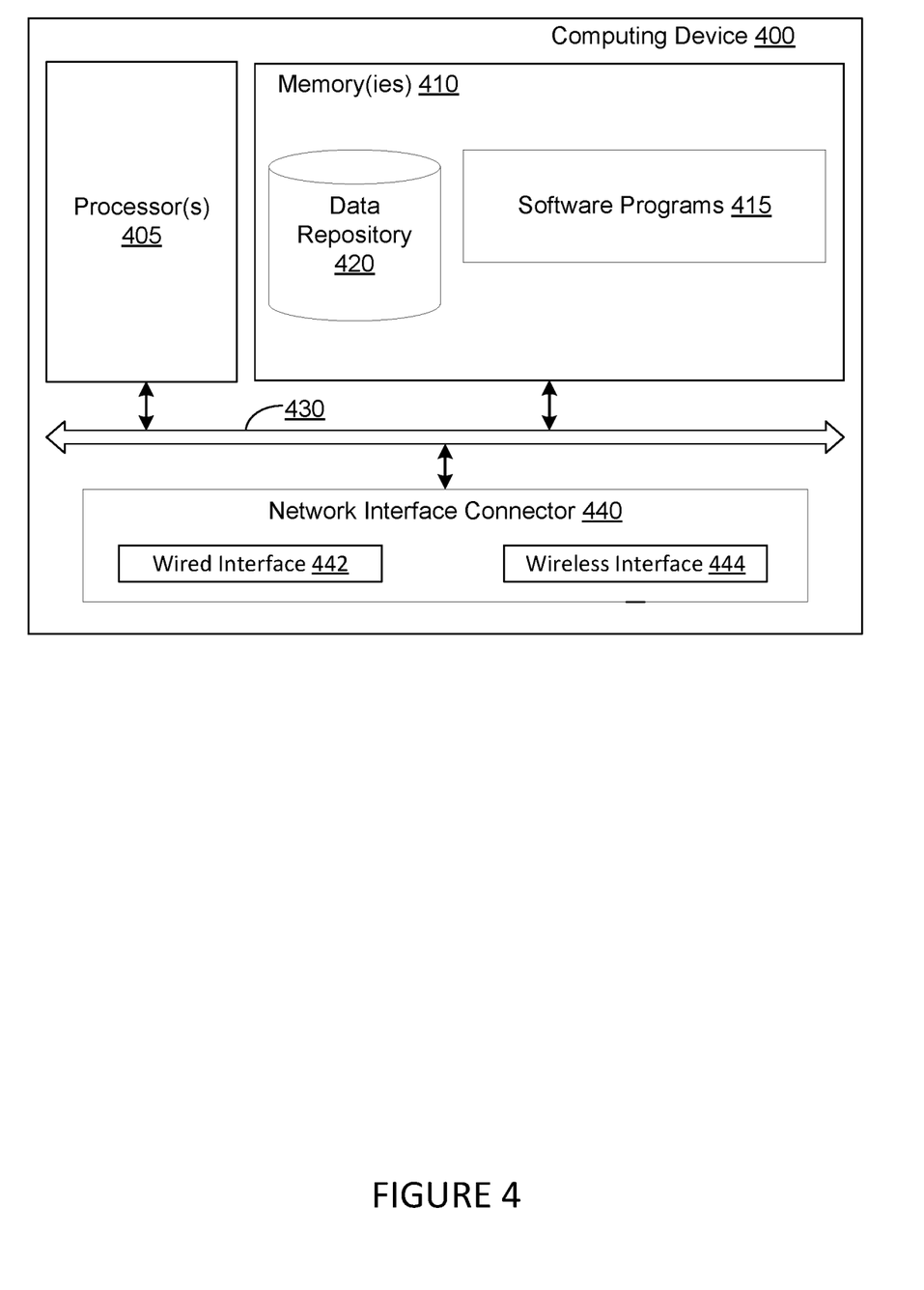
FIG. 4 depicts an exemplary computing system for implementing aspects of the present disclosure.

FIG. 4 depicts an exemplary computing system for implementing aspects of the present disclosure. FIG. 4 depicts exemplary computing device 400. Computing device 400 may represent the system components described herein, including, for example, backend electronic device 410, user workstation 420, user mobile electronic device 430, etc. Computing device 400 may include processor 405 that may be coupled to memory 410. Memory 410 may include volatile memory. Processor 405 may execute computer-executable program code stored in memory 410, such as software programs 415. Software programs 415 may include one or more of the logical steps disclosed herein as a programmatic instruction, which may be executed by processor 405. Memory 410 may also include data repository 420, which may be nonvolatile memory for data persistence. Processor 405 and memory 410 may be coupled by bus 430. Bus 430 may also be coupled to one or more network interface connectors 440, such as wired network interface 442 or wireless network interface 444. Computing device 400 may also have user interface components, such as a screen for displaying graphical user interfaces and receiving input from the user, a mouse, a keyboard and/or other input/output components (not shown).

Although multiple embodiments have been described, it should be recognized that these embodiments are not exclusive to each other, and that features from one embodiment may be used with others.

Hereinafter, general aspects of implementation of the systems and methods of embodiments will be described.

Embodiments of the system or portions of the system may be in the form of a "processing machine," such as a general-purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

In one embodiment, the processing machine may be a cloud-based processing machine, a physical processing machine, or combinations thereof.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement embodiments may be a general-purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA (Field-Programmable Gate Array), PLD (Programmable Logic Device), PLA (Programmable Logic Array), or PAL (Programmable Array Logic), or any other device or arrangement of devices that is capable of implementing the steps of the processes disclosed herein.

The processing machine used to implement embodiments may utilize a suitable operating system.

It is appreciated that in order to practice the method of the embodiments as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above, in accordance with a further embodiment, may be performed by a single component. Further, the processing performed by one distinct component as described above may be performed by two distinct components.

In a similar manner, the memory storage performed by two distinct memory portions as described above, in accordance with a further embodiment, may be performed by a single memory portion. Further, the memory storage performed by one distinct memory portion as described above may be performed by two memory portions.

Further, various technologies may be used to provide communication between the various processors and/or memories, as well as to allow the processors and/or the memories to communicate with any other entity; i.e., so as to obtain further instructions or to access and use remote memory stores, for example. Such technologies used to provide such communication might include a network, the Internet, Intranet, Extranet, a LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of embodiments. The set of instructions may be in the form of a program or software. The software may be in the form of system software or application software, for example. The software might also be in the form of a collection of separate programs, a program module within a larger program, or a portion of a program module, for example. The software used might also include modular programming in the form of object-oriented programming. The software tells the processing machine what to do with the data being processed.

Further, it is appreciated that the instructions or set of instructions used in the implementation and operation of embodiments may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments. Also, the instructions and/or data used in the practice of embodiments may utilize any compression or encryption technique or algorithm, as may be desired. An encryption module might be used to encrypt data. Further, files or other data may be decrypted using a suitable decryption module, for example.

As described above, the embodiments may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in embodiments may take on any of a variety of physical forms or transmissions, for example. Illustratively, the medium may be in the form of a compact disc, a DVD, an integrated circuit, a hard disk, a floppy disk, an optical disc, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors.

Further, the memory or memories used in the processing machine that implements embodiments may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the systems and methods, a variety of "user interfaces" may be utilized to allow a user to interface with the processing machine or machines that are used to implement embodiments. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method, it is not necessary that a human user actually interact with a user interface used by the processing machine. Rather, it is also contemplated that the user interface might interact, i.e., convey and receive information, with another processing machine, rather than a human user. Accordingly, the other processing machine might be characterized as a user. Further, it is contemplated that a user interface utilized in the system and method may interact partially with another processing machine or processing machines, while also interacting partially with a human user.

It will be readily understood by those persons skilled in the art that embodiments are susceptible to broad utility and application. Many embodiments and adaptations of the present invention other than those herein described, as well as many variations, modifications and equivalent arrangements, will be apparent from or reasonably suggested by the foregoing description thereof, without departing from the substance or scope.

Accordingly, while the embodiments of the present invention have been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A method for uniquely identifying and regularly authenticating users at login, comprising:
   receiving, by an authentication computer program executed by a backend electronic device and from a workstation computer program executed by a workstation, a user identifier for a user as part of a login attempt and user login activity data associated with the login attempt;
   communicating, by the authentication computer program, a multifactor authentication request to an authenticator application executed on a user mobile electronic device;
   receiving, by the authentication computer program, a response to the multifactor authentication request from the authenticator application; verifying, by the authentication computer program, that the response to the multifactor authentication request matches an expected value;
   calculating, by a user trust computer program executed by the backend electronic device, a user trust score based on the user login activity data;
   determining, by the user trust computer program, that the user trust score is above a threshold, wherein the threshold is dynamic and varies based on a time of day, a day of the week, a user location, and/or one or more networks over which the user mobile electronic device communicates; and
   authorizing, by the user trust computer program, the login attempt to the workstation and a user session on the workstation.

2. The method of claim 1, wherein the multifactor authentication request comprises a request to receive a machine-readable code from the workstation, a response to a push notification to the user mobile electronic device, or a proximity indication between the user mobile electronic device and the workstation.

3. The method of claim 1, wherein the multifactor authentication request comprises a biometric or password provided by the user.

4. The method of claim 1, wherein the user login activity data comprises attributes include a time of day, a location of the workstation, an internet service provider for the user mobile electronic device, a geolocation of the user mobile electronic device, user mobile electronic device operating system information, or user mobile electronic device.

5. The method of claim 1, wherein the threshold is based on a prior user activity data.

6. The method of claim 5, wherein the user trust computer program trains a machine learning engine using the prior user activity data.

7. The method of claim 1, wherein the user session is limited based on the user trust score.

8. The method of claim 1, further comprising:
monitoring, by the user trust computer program, user activity during the user session;
updating, by the user trust computer program, the user trust score; and
requiring, by the user trust computer program, additional authentication in response to the updated user trust score falling below the threshold.

9. A method for uniquely identifying and regularly authenticating users at login, comprising:
receiving, by an authentication computer program executed by a backend electronic device and from a workstation computer program executed by a workstation, a user identifier for a user as part of a login attempt and user login activity data associated with the login attempt;
communicating, by the authentication computer program, a multifactor authentication request to an authenticator application executed on a user mobile electronic device;
receiving, by the authentication computer program, a response to the multifactor authentication request from the authenticator application;
verifying, by the authentication computer program, that the response to the multifactor authentication request matches an expected value;
calculating, by a user trust computer program executed by the backend electronic device, a user trust score based on the user login activity data;
determining, by the user trust computer program, that the user trust score is below a threshold, wherein the threshold is dynamic and varies based on a time of day, a day of the week, a user location, and/or one or more networks over which the user mobile electronic device communicates;
receiving, by the user trust computer program, an additional authentication factor from the user;
validating, by the user trust computer program, the additional authentication factor; and
authorizing, by the user trust computer program, the login attempt to the workstation and a user session on the workstation.

10. The method of claim 9, wherein the multifactor authentication request comprises a request to receive a machine-readable code from the workstation, a response to a push notification to the user mobile electronic device, or a proximity indication between the user mobile electronic device and the workstation.

11. The method of claim 9, wherein the multifactor authentication request comprises a biometric or password provided by the user.

12. The method of claim 9, wherein the user login activity data comprises attributes include a time of day, a location of the workstation, an internet service provider for the user mobile electronic device, a geolocation of the user mobile electronic device, user mobile electronic device operating system information, or user mobile electronic device.

13. The method of claim 9, wherein the threshold is based on a prior user activity data.

14. The method of claim 13, wherein the user trust computer program trains a machine learning engine using the prior user activity data.

15. The method of claim 9, wherein the user session is limited based on the user trust score.

16. The method of claim 9, further comprising:
monitoring, by the user trust computer program, user activity during the user session;
updating, by the user trust computer program, the user trust score; and
requiring, by the user trust computer program, additional authentication in response to the updated user trust score falling below the threshold.

17. A system, comprising:
a user workstation executing a workstation computer program;
a user mobile electronic device executing an authenticator application; and
a backend electronic device executing an authentication computer program and a user trust computer program;
wherein:
the workstation computer program receives a user identifier for a user as part of a login attempt and user login activity data associated with the login attempt and provides the user identifier and the user login activity data to the authentication computer program;
the authentication computer program communicates a multifactor authentication request to the authenticator application, the multifactor authentication request comprising a request to receive a machine-readable code from the workstation, a response to a push notification to the user mobile electronic device, a proximity indication between the user mobile electronic device and the workstation, a user biometric, or a user password;
the authentication computer program receives a response to the multifactor authentication request from the authenticator application; the authentication computer program verifies that the response to the multifactor authentication request matches an expected value;
the user trust computer program calculates user trust score based on the user login activity data;
the user trust computer program determines that the user trust score is above a threshold, wherein the threshold is dynamic and varies based on a time of day, a day of the week, a user location, and/or one or more networks over which the user mobile electronic device communicates; and
the user trust computer program authorizes the login attempt to the workstation and a user session on the workstation.

18. The system of claim 17, wherein the user trust computer program monitors user activity during the user session, updates the user trust score, and requires additional authentication in response to the updated user trust score falling below the threshold.

* * * * *